United States Patent
Rhine

(10) Patent No.: US 8,046,766 B2
(45) Date of Patent: Oct. 25, 2011

(54) PROCESS ASSIGNMENT TO PHYSICAL PROCESSORS USING MINIMUM AND MAXIMUM PROCESSOR SHARES

(75) Inventor: Scott Rhine, Frisco, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1216 days.

(21) Appl. No.: 11/740,850

(22) Filed: Apr. 26, 2007

(65) Prior Publication Data

US 2008/0270752 A1  Oct. 30, 2008

(51) Int. Cl.
G06F 9/46 (2006.01)
G06F 15/173 (2006.01)

(52) U.S. Cl. .................. 718/104; 718/105; 709/226

(58) Field of Classification Search .................. None
See application file for complete search history.

(56) References Cited

U.S. PATENT DOCUMENTS

| | | | | |
|---|---|---|---|---|
| 3,905,023 A * | 9/1975 | Perpiglia | .................. | 714/6 |
| 6,003,062 A | 12/1999 | Greenberg et al. | | |
| 6,078,938 A * | 6/2000 | Pan et al. | .................. | 708/500 |
| 6,195,676 B1 * | 2/2001 | Spix et al. | .................. | 718/107 |
| 6,430,592 B1 * | 8/2002 | Davison | .................. | 718/103 |
| 6,438,573 B1 * | 8/2002 | Nilsen | .................. | 718/100 |
| 6,438,704 B1 * | 8/2002 | Harris et al. | .................. | 713/502 |
| 6,687,735 B1 * | 2/2004 | Logston et al. | .................. | 709/203 |
| 6,859,926 B1 | 2/2005 | Brenner et al. | | |
| 6,877,035 B2 * | 4/2005 | Shahabuddin et al. | .................. | 709/226 |
| 6,941,365 B2 * | 9/2005 | Sirgany | .................. | 709/223 |
| 7,136,800 B1 * | 11/2006 | Vega | .................. | 703/23 |
| 7,143,413 B2 | 11/2006 | McCarthy et al. | | |
| 7,290,260 B2 * | 10/2007 | Miller | .................. | 718/104 |
| 7,383,142 B2 * | 6/2008 | Scoullar et al. | .................. | 702/66 |
| 2002/0016785 A1 * | 2/2002 | Sirgany | .................. | 706/46 |
| 2002/0143945 A1 * | 10/2002 | Shahabuddin et al. | .................. | 709/226 |
| 2004/0117790 A1 | 6/2004 | Rhine | | |
| 2004/0194089 A1 * | 9/2004 | McCarthy et al. | .................. | 718/100 |
| 2005/0039183 A1 | 2/2005 | Romero et al. | | |
| 2005/0198636 A1 * | 9/2005 | Barsness et al. | .................. | 718/100 |
| 2005/0283782 A1 * | 12/2005 | Lu et al. | .................. | 718/100 |
| 2006/0064698 A1 * | 3/2006 | Miller et al. | .................. | 718/104 |
| 2006/0101470 A1 * | 5/2006 | Swanberg | .................. | 718/105 |
| 2006/0156309 A1 | 7/2006 | Rhine et al. | | |
| 2006/0195827 A1 | 8/2006 | Rhine | | |
| 2006/0195845 A1 | 8/2006 | Rhine | | |
| 2006/0288346 A1 * | 12/2006 | Santos et al. | .................. | 718/102 |

OTHER PUBLICATIONS

Ralf Gruber, Vincent Keller, Pierre Kuonen, Marie-Christine Sawley, Basile Schaeli, Ali Tolou, Marc Torruella, Trach-Minh Tran, "Towards an Intelligent GRID Scheduling System", 2005, Proc. of the 6th Int. Conf. PPAM 2005.*

* cited by examiner

*Primary Examiner* — Meng An
*Assistant Examiner* — Abdullah Al Kawsar

(57) ABSTRACT

A system and method is provided for assigning a plurality of executable processes to a plurality of physical processors in a multi-processor computer system using a minimum processor share and a maximum processor share defined for each executable process. In an embodiment, the method can include allocating shares of total processor time to each executable process in proportion to the minimum processor shares up to the maximum processor shares to form target share allocations. The target share allocations can be used to map processes to the physical processors.

22 Claims, 3 Drawing Sheets

PROCESS ASSIGNMENT TO PHYSICAL PROCESSORS USING MINIMUM AND MAXIMUM PROCESSOR SHARES

BACKGROUND

Computing systems often have various limitations on system resources. For example, a multi-processor computer system may have a large, but finite, number of central processing units (CPUs). Processes executing on the computer system may compete for the system resources. Accordingly, it is often desirable to efficiently allocate the system resources among executable processes running on the system.

Various scheduling algorithms have been developed to allocate system resources. For example, a simple scheduling algorithm is the first-come, first-served algorithm, wherein processes requiring a resource are allowed to access that resource in the order in which they have requested it. When the importance or priority of the processes is not all equal, the first-come, first-served algorithm can provide a relatively poor solution. Better performance can be obtained in some situations using priority schemes, such as preemptive scheduling.

As the constraints placed upon the scheduling problem become more complex, obtaining an efficient solution becomes difficult. One particular complication is when there are multiple processes which can be assigned to multiple resources and/or processors. The addition of constraints, such as minimum resource allocations or maximum resource allocations on a per process basis adds even more complexity to the scheduling problem. Optimal solutions to such a multidimensional problem can take a considerable amount of computation to solve.

DETAILED DESCRIPTION OF EXAMPLE EMBODIMENTS

Reference will now be made to the exemplary embodiments illustrated, and specific language will be used herein to describe the same. It will nevertheless be understood that no limitation of the scope of the invention is thereby intended.

In view of the difficulties presented by scheduling the use of resources or processors in a computer system, it has been recognized that improved techniques for assigning executable processes to physical processors in a multi-processor computer system would be valuable. Accordingly, embodiments of the present system and methods provide for the assignment of a plurality of executable processes to a plurality of physical processors in a multi-processor computer system. The assignment technique can include the definition of a minimum processor share and a maximum processor share for each executable process.

Figure 1:
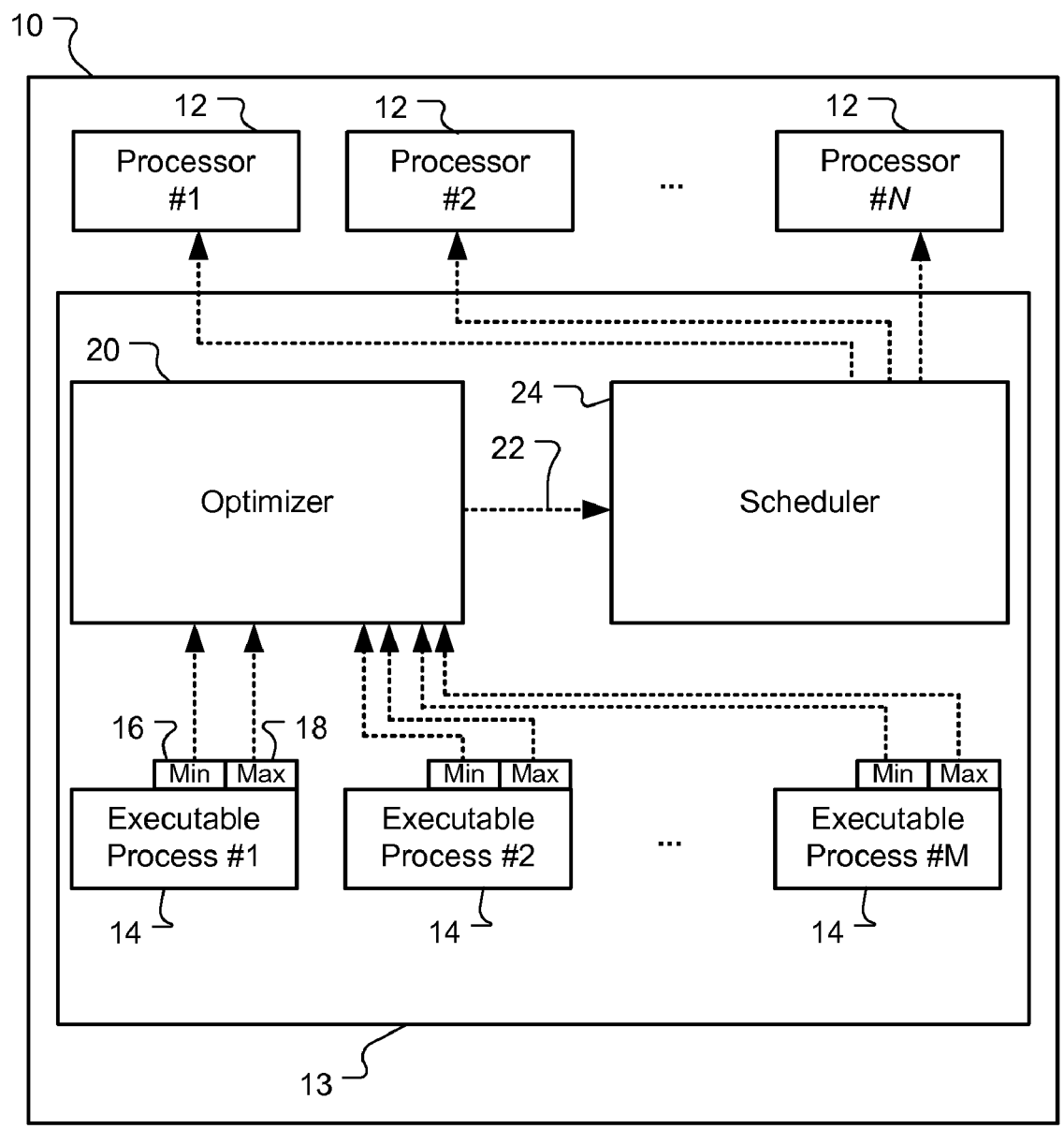
FIG. 1 is a block diagram of a multi-processor computer system in accordance with an embodiment.

FIG. 1 illustrates a block diagram of a computer system in accordance with an embodiment. The computer system 10 includes a plurality of N processors 12. For example, the processors may be central processing units (CPUs) of a multi-CPU computer system. Various numbers of processors may be provided, including for example N being within the range of 4 and 32. While the following description will be described primarily for an example where the processors are CPUs, it will be appreciated that the processors may be other system resources, such as, for example, input/output resources, memory, peripherals, and the like. The optimizer and scheduler may be integrated into a computer operating system 13. For example, a computer operating system may be a batch scheduling system, a grid computing operating system, or, as a particular example, the HP-UX computer operating system.

A plurality of M executables 14 execute on the computer system, and are to be assigned to the plurality of processors 12 for execution. For example, the executables may be computer-readable code which is executed by a CPU. The number of executables may be more or less than the number of processors. For example, M may be within the range of 1 and 1024. Generally, the allocation problem is trivial when the number of processes is less than or equal to the number of processors, since each process may be allocated to a processor. Allocation is generally more difficult when M is greater than N. For each executable process, a minimum processor share 16 and a maximum processor share 18 are defined. A different minimum processor share and a different maximum processor share may be defined for each executable process. Processes may request and be allocated to more than one processor. Zero, one, or more than one executable process may be allocated to each processor.

An optimizer 20 determines a plurality of target share allocations for the plurality of executables 14. The target share allocation represent theoretically ideal allocations of processor time, which may not be achievable for a specific number of processors and distribution of processor shares for the executable tasks, as will become more apparent from the following discussion. Use of the target share allocations helps to reduce the computational complexity in allocating the executable processes to processors 12.

The optimizer 20 may, for example, be an executable process which executes on one or more of the processors. The optimizer determines a plurality of target share allocations 22 for the plurality of executable processes 14 by proportionally scaling the minimum processor shares 16, while limiting the target share allocations by the maximum processor shares 18.

When the total of the minimum shares 18 is less than the total available processor time, the target share allocations 22 are obtained by scaling up the minimum processor shares while retaining the same relative proportions up to the maximum processor share. In other words, target share allocations are scaled up and clipped to their maximum processor share. If the total of the minimum processor shares are less than the total available processor time, the maximum processor shares 18 can be ignored. This is because the maximum processor shares will not be reached. The optimizer may include, for example, an iterative matrix solver, as will be described further below.

The scheduler 24 accepts the target share allocations 22 from the optimizer 20, and assigns each of the plurality of executables 14 to at least one of the plurality of processors 12 based on the target share allocations. By assigning the executable processes based on the target share allocations, the executable processes may be assigned to processors in such a way that efficient use of the processors is obtained. The scheduler may be, for example, an integer partitioning problem solver as will be explained further below.

Figure 2:
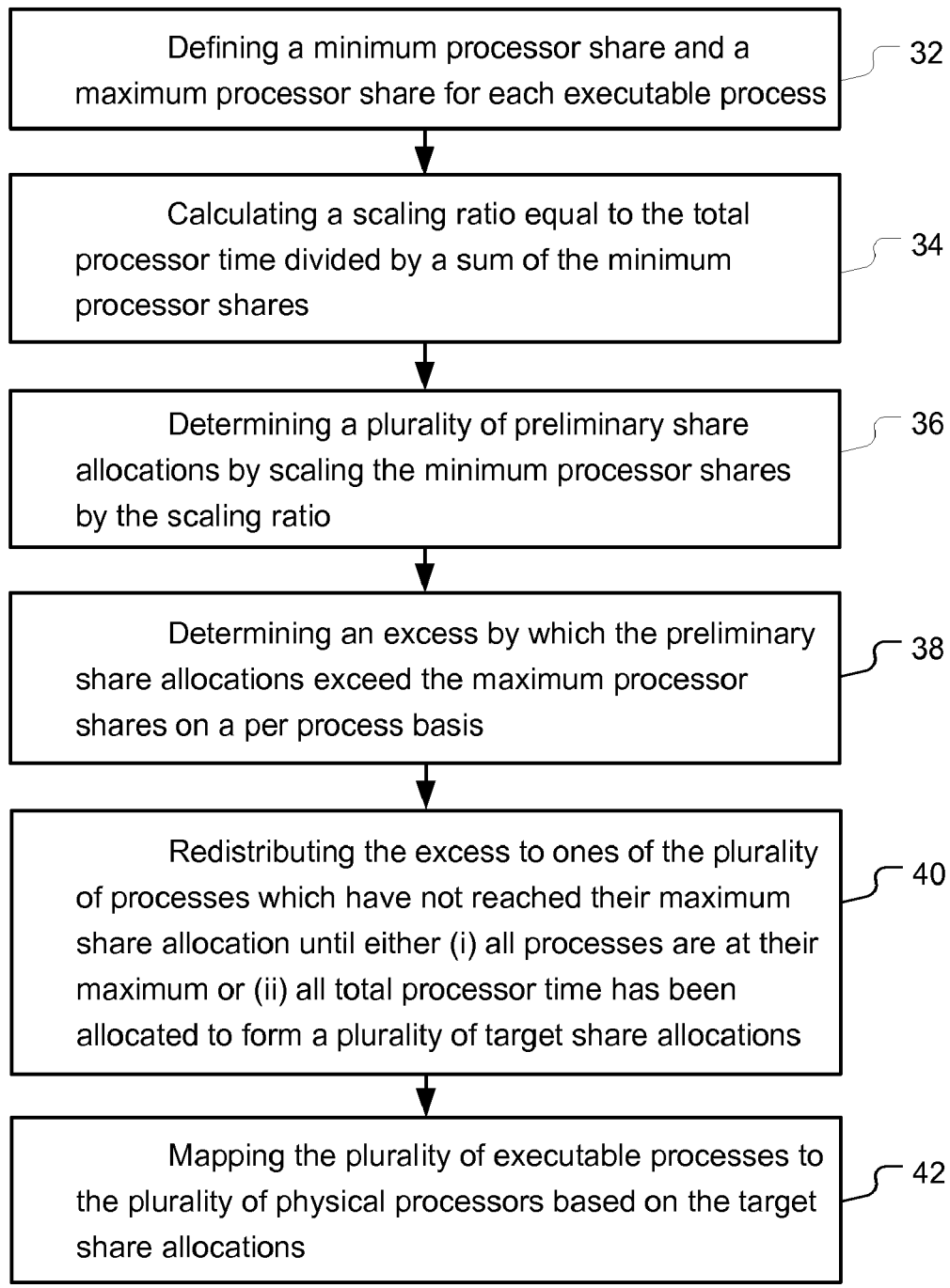
FIG. 2 is flow chart of a method of assigning a plurality of executable processes to a plurality of physical processors in accordance with an embodiment.

The flow chart of FIG. 2 illustrates a method 30 for assigning a plurality of executable processes to a plurality of physical processors. A first step of the method is defining 32 a minimum processor share and a maximum processor share for each executable process.

For illustration, an example where 6 executable processes (A, B, C, D, E and F) are to be allocated to a four processor system (CPU0, CPU1, CPU2, and CPU3) is shown in Table 1 below. The column labeled CPUs represents a number of CPUs to be used by each process, although this is not essential (in other words, processes may be allocated to only one CPU).

TABLE 1

Example Minimum and Maximum Processor Shares

| Process | CPUs Requested | Minimum Share | Maximum Share |
|---|---|---|---|
| A | 1 | 10% | 100% |
| B | 2 | 20% | 100% |
| C | 1 | 30% | 30% |
| D | 1 | 40% | 40% |
| E | 2 | 50% | 100% |
| F | 1 | 60% | 100% |

The total processor time available in a four CPU system will be 400%. For this example, however, the sum of the minimum processor shares is less than 400% so the system is under loaded. More particularly, the sum of the minimum processor shares can be obtained by forming the sum-product of the minimum shares multiplied the number of requested processors, to obtain a total of 280% (280%=10%*1+20%*2+30%*1+40%*1+50%*2+60%*1). Of course, for a simpler case where each process only requests a single processor the total is obtained by summing the minimum processor shares directly. Hence, summing the minimum processor shares can include taking into account executable process requests for multiple processors.

A next step is calculating 34 a scaling ratio equal to the total processor time divided by a sum of the minimum processor shares. In this example, the scaling ratio is approximately 1.43 (400%/280%). A plurality of preliminary share allocations are determined 36 by scaling the minimum processor shares by the scaling ratio. Table 2 shows the results of scaling the preliminary share allocations.

TABLE 2

Example Minimum and Maximum Processor Shares

| Process | Preliminary Share Allocations | Excess | Target Share Allocations |
|---|---|---|---|
| A | 14.3% | 0 | 15.7% |
| B | 28.6% | 0 | 31.4% |
| C | 42.9% | 12.9% | 30% |
| D | 57.1% | 17.1% | 40% |
| E | 71.4% | 0 | 78.6% |
| F | 85.7% | 0 | 94.3% |

The next step is determining 38 an excess by which the preliminary share allocations exceed the maximum processor shares on a per process basis. It can be seen that the preliminary share allocations for processes C and D exceed their maximum share allocations. The excess totals 30% (12.9%+17.1%). The excess represents processor time which has been allocated to processes C and D but cannot be used because these processes are already at their maximum processor share. This excess will be redistributed to other processes which have not yet reached their maximum share allocation. When redistributing the excess, the excess can be redistributed to the processes in proportion to the process minimum shares (for those processes that are not already at their maximum shares).

The step of redistributing 40 the excess to processes which have not reached their maximum share allocation helps to use the CPUs more efficiently. When redistributing the excess, it is possible that some processes will again exceed their maximum share allocations. When this occurs, a new excess can be determined, and the new excess redistributed as above. The process can be repeated iteratively, either until all of the executable processes are at their maximum or until all of the total processor time has been allocated. This forms a plurality of target share allocations as shown in the last column of Table 2.

Scaling the target share allocations and redistributing excess may be efficiently implemented using iterative matrix techniques. For example, the minimum, maximum, and target share allocations may be maintained in a data memory in the form of a matrix, and iteratively processed on a per-row (per-process) basis to perform the various steps of the method.

A final step of the method is mapping 42 the plurality of executable processes to the plurality of physical processors based on the target share allocation. The mapping can be performed by approximating a solution to the integer partitioning problem.

For example, one approximate solution to the integer partitioning problem is as follows. A first executable process having the highest target share allocation is allocated to a most lightly loaded processor. For example, as shown in Table 2, process F has the highest target share allocation, so it can be assigned to CPU0. The approximate solution iterates by repeatedly assigning the next highest target share of the plurality of executable processes to a most lightly loaded processors until all processes are assigned to a process. So, in the example of Table 2, process E has the next highest target share allocation, and is assigned to CPU1. Because process E requests two CPUs, it is also assigned to CPU2. Process D is then assigned to CPU3. As this point, each CPU has one or more processes assigned to it. Process B has the next highest target share allocation, and will be assigned to CPU1 and CPU3, since these are the most lightly loaded two CPUs, and process B requests two CPUs. Finally, process A is assigned to CPU2. The sequence of these assignments is summarized in Table 3 which shows, step by step, the processor loads after each allocation.

TABLE 3

Sequential Mapping of Executables

| Step | CPU0 load | CPU1 load | CPU2 load | CPU3 load |
|---|---|---|---|---|
| Initial | 0 | 0 | 0 | 0 |
| Assign F | 94.3 | 0 | 0 | 0 |
| Assign E | 94.3 | 78.6 | 78.6 | 0 |
| Assign D | 94.3 | 78.6 | 78.6 | 40.0 |
| Assign B | 94.3 | 110.0 | 78.6 | 71.4 |
| Assign C | 94.3 | 110.0 | 78.6 | 101.4 |
| Assign A | 94.3 | 110.0 | 94.3 | 101.4 |

The end result of the mapping process is as follows:
CPU0 has process F
CPU1 has processes B & E
CPU2 has processes A & E
CPU3 has processes B, C, & D It can be seen that the assignments result in a relatively balanced demand on the processors. Note, however, that the total of the target allocations may be greater or less than 100% for the individual processors. This is because, in general, the target share allocations may not evenly distribute to the processors. The target share allocations represent a theoretical allocation that may not be actually achievable for a specific number of processors and executable process configurations.

If desired, a projected share use can be determined for each executable process. For example, the executable processes assigned to a processor which has assigned less than 100%, the executable processes assigned to that processor may have their allocations further increased (in proportion to their minimum shares, up to their maximum shares). For processors which are assigned more than 100%, the executable processes may have their allocations reduced (in proportion to their minimum shares). In general, it is desirable to ensure that minimum processor shares and maximum processor shares are enforced, and that executable processes with higher minimum shares receive higher amounts of processor time. Furthermore, executable processes with the same minimum shares should receive that same amount of processor time. Thus, no more than 100% of minimum shares should be assigned to the same processor.

For the example above, when the processor allocations are rescaled as just described, the projected share use is as shown in Table 4. Note that for processes using two CPUs, different shares may be achieved on the two CPUs as shown by the two figures in the projected share column.

TABLE 4

Projected Share Use

| Process | Minimum Share | Maximum Share | Projected Share |
|---|---|---|---|
| A | 10 | 100 | 16.6 |
| B | 20 | 100 | 28.5, 30 |
| C | 30 | 30 | 30 |
| D | 40 | 40 | 40 |
| E | 50 | 100 | 83.4, 71.5 |
| F | 60 | 100 | 100 |

In short, the executable processes are allocated fairly to the processors, while the total processor time available is used to the maximum extent possible. For this example, each CPU can be used 100% of the time by the assigned executable processes.

In contrast, an assignment approach that fails to take into account the maximum share may result in assignment of processes to a CPU, where the processes reach their respective maximum shares before the processor is fully utilized. For example, consider a case where three processes are to be allocated to two processors as shown in Table 5.

TABLE 5

Example Distribution of Three Processes onto Two Processors

| Process | min | max | target |
|---|---|---|---|
| A | 19 | 100 | 50 |
| B | 38 | 100 | 100 |
| C | 43 | 50 | 50 |

A straightforward allocation using just the minimums (ignoring the maximums) places process C on the first processor and processes A and B on the second processor. Utilization of the first processor is thus capped at 50% (the maximum for process C). Processes A and B can scale up to receive 33.3% and 66.6% of the second processor.

In contrast, by using the method 30, target allocations for the processes are as shown in Table 6. The target allocation for process C is capped at 50%, while the target allocations for A and B have scaled up proportionally. When the mapping is performed, process B is assigned to the first processor and processes A and C are assigned to the second processor. An improved utilization of the processors is obtained, as both processors can be used 100%.

While one particular approximate solution to the integer partitioning problem was discussed above, other approximate solutions to the integer partitioning problem can be used. For example, a trivial solution is to assign each executable process to its own processor. This approach works when the number of executable processes is equal to or less than the number of physical processors. Another solution approach is a recursive difference method. In the recursive difference method, target allocations are sorted in descending order and a first pass builds a decision tree by pushing the largest two items onto the tree and subtracting. If the two largest two items are equal, the items are pushed onto a solution stack. If the difference is non-zero, it is placed onto into the sorted list, and the next two items are popped and compared. The process continues as before, until one item remains, which is the final difference. On the second pass, all deferred decisions are completed, placing the nodes from one branch in one bin (e.g., assigned to one processor) and placing the nodes from the other branch in another other bin (e.g., assigned to a second processor). The difference method can be generalized for multiple processors.

If desired, multiple solutions to the integer partitioning problem can be found, and then graded. A best solution (e.g., one that obtains the best overall load balancing) may then be selected.

While the foregoing discussion has treated each executable process as though it is a single executable task, an executable process can include a group of executable tasks. For example, each executable process may correspond to a group of equivalent tasks which share equally in the allocated processor time.

The assignment technique using approximate solutions to the integer partitioning problem may result in differing allocations of processor time for equivalent processes. Equivalent processes are processes which request the same minimum and maximum share. Accordingly, improved performance may be obtained by rotating the assignments across the processors for the equivalent executable processes.

As a particular example, suppose that equivalent processes X and Y are allocated as follows. Process X is allocated to CPU0, and is projected to receive a 26% processor share, and process Y is allocated to CPU1, and is projected to receive a 34% processor share. Periodically, process X and Y can rotate their positions, process Y being given a 26% share on CPU0 and process X being given a 34% share on CPU1. This can help to achieve a fairer distribution of processor time across the processes. Similar rotation of a group of executable tasks within an executable process can be performed. Rotation may occur periodically, for example at time intervals of one second, one minute, or other time intervals.

As another example, consider the case of two executable processes requesting a minimum share of 60% and each requesting three processors. When four processors are available, the target allocations will be 66.6%. When actually allocated to four processors, it can be seen that one of the processors will have two different processes assigned. Hence, the resulting shares will end up being 100%, 100%, and 50%. By regularly rotating the assignments of the processes to processors, a more fair achievement will result, averaging out to 66.6%.

Assignments need not remain static. For example, some processes may terminate execution, and thus no longer require assignment to a processor. New processes may be initiated which request assignment to a processor. Minimum share and maximum shares may be changed. Accordingly, the allocation and mapping may be periodically repeated, for example, at time intervals of one second, one minute, or other time intervals.

Figure 3:
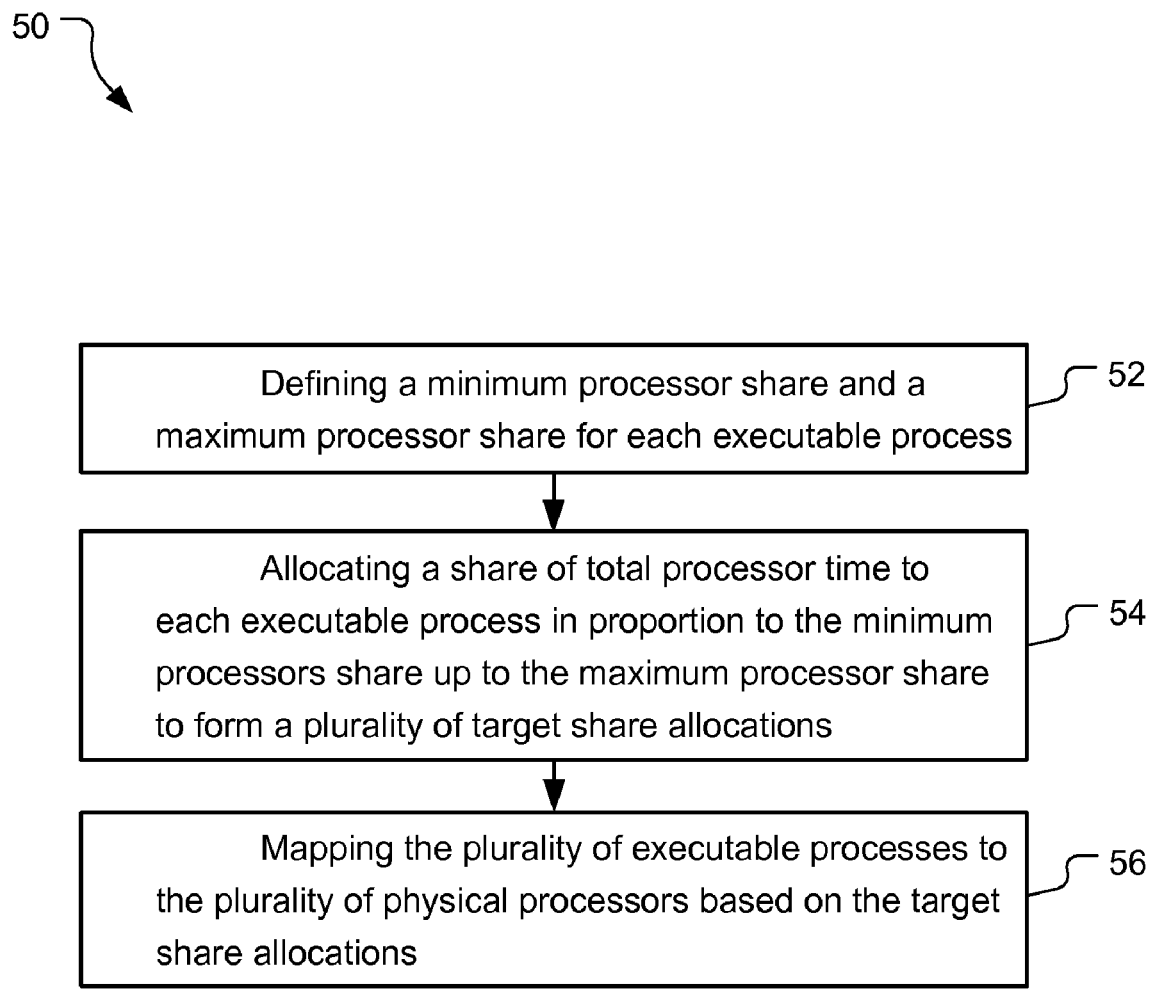
FIG. 3 is a flow chart of a method of assigning a plurality of executable processes to a plurality of physical processors in accordance with an embodiment.

Another method of assigning a plurality of executable processes to a plurality of physical processors is illustrated in flow chart form in FIG. 3. The method 50 can include defining 52 a minimum processor share and a maximum processor share for each executable process, for example as described above. The method can also include allocating 54 a share of total processor time to each executable process in proportion to the minimum processor share, up to the maximum processor share, to form a plurality of target share allocations. For example, the target share allocations can be obtained as described above. The method can also include mapping 56 the plurality of executable processes to the plurality of physical processors based on the target share allocations. For example, the mapping can be obtained as described above. If desired, the method can include additional steps, for example as described above.

The methods described herein may be implemented in computer program code. For example, computer program code may be stored on a computer readable medium, such as non-volatile read only memory, erasable read only memory, programmable read only memory, a floppy disk, a magnetic tape, a CD ROM, a DVD ROM, a USB flash drive, or the like. The computer program code may be stored in a non-volatile memory and loaded into a volatile memory during operation of the processor. The computer program code may be included within an operating system. The computer program code may be executed by one, two, or more CPUs within a multi-CPU system.

Information, such as minimum processor share, maximum processor share, number of requested processors, target share allocations, projected share use, etc. can be stored in a memory. For example, each executable process may include data structures defining the above parameters. Executable processes may include computer readable program code stored in a memory as described above.

The methods described herein may be applied, for example, in allocating processing resources within a distributed server application. For example, executable processes may correspond to web servers, point of sale services, and database servers, which are allocated to processor resources within a data center. As another example, an email service may have hundreds of clients which are served by executable processes. Clients using free services may have relatively low maximum share allocations, while premium users receive higher minimum share allocations in proportion to the level of service for which they pay.

Summarizing and reiterating to some extent, techniques for assigning a plurality of executable processes to a plurality of physical processors have been described. The inclusion of a minimum processor share and a maximum processor share for each executable process provides increased flexibility in tuning the allocation of processor time to the executable processes. Solution techniques such as iterative matrix methods and approximations to the integer partitioning problem can be used to provide efficient allocation of the executable processes to the processors. Improved load balancing and utilization of the processors may be obtained in the presence of complex constraints, such as minimum requests, maximum limits, and multiple-CPU usage for individual processes.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of assigning a plurality of executable processes to a plurality of physical processors in a multi-processor computer system, each of said executable processes having a minimum share and a maximum share of processor time from the plurality of physical processors they are allocated, a sum of the minimum processor shares being less than a total processor time of the plurality of physical processors, said method comprising:
    determining respective target share allocations by scaling the minimum processor shares by a scaling ratio corresponding to the total processor time of the plurality of physical processors divided by a sum of the minimum processor shares of the plurality of executable processes; and
    mapping the plurality of executable processes to the plurality of physical processors based on the respective target share allocations.

2. The method of claim 1 wherein, in the event a target share exceeds a respective maximum share for an executable process,
    determining an excess by which the target share allocation exceeds the maximum processor share; and
    adjusting said target shares by redistributing the excess to other ones of the plurality of processes which have not reached their maximum share allocation.

3. The method of claim 2, wherein determining an excess and redistributing the excess is performed iteratively until either (i) all processes are at their maximum or (ii) all total processor time has been allocated.

4. The method of claim 1, wherein allocating a proportional share of total processor time is performed using an iterative matrix technique.

5. The method of claim 1, wherein mapping the plurality of executable processes comprises approximating a solution to the integer partitioning problem.

6. The method of claim 5, wherein mapping the plurality of executable processes comprises:
    assigning one of the plurality of executable processes having the highest target share allocation to a most lightly loaded processor; and
    repeatedly assigning a next one of the plurality of executable processes having a next highest target share allocation to a most lightly loaded processor until all processes are assigned to a processor.

7. The method of claim 1, wherein each executable process comprises a group of equivalent tasks.

8. The method of claim 1, further comprising rotating the assignments across the processors for equivalent executable processes.

9. The method of claim 1, wherein at least one of the plurality of executable processes is mapped to two or more of the processors.

10. A computer readable medium comprising computer readable program code when executed by one or more processors to implement the method of claim 1.

11. A method of assigning a plurality of executable processes to a plurality of physical processors in a multi-processor computer system, each of said processes having a minimum share and a maximum share of processor time from the plurality of physical processors they are allocated, a sum of the minimum processor shares being less than a total processor time of the plurality of physical processors, said method comprising:

determining a plurality of preliminary share allocations by scaling up the minimum processor shares by a scaling ratio corresponding to the total processor time of the plurality of physical processors divided by a sum of the minimum processor shares of the plurality of executable processes;

determining an excess by which the preliminary share allocations exceed the maximum processor shares on a per process basis; and redistributing the excess to processes which have not reached their maximum share allocation; and mapping the plurality of executable processes to the plurality of physical processors based on the target share allocations.

12. The method of claim 11, wherein redistributing the excess is performed iteratively until either (i) all processes are at their maximum or (ii) all total processor time has been allocated to form a plurality of target share allocations.

13. The method of claim 11, wherein allocating a proportional share of total processor time and mapping the plurality of executable processes is repeated at time intervals of one minute.

14. The method of claim 11, further comprising determining a projected share use for each executable process.

15. A multi-processor computer system comprising:

a plurality of N processors;

a plurality of M executables, wherein a minimum processor share and a maximum processor share of processor time is defined for each executable from the plurality of N processors they are allocated;

an optimizer configured to determine respective target share allocations by scaling the minimum processor shares by a scaling ratio corresponding to the total processor time of the plurality of N processors divided by a sum of the minimum processor shares of the plurality of M executables while limiting the target share allocations by the maximum processor shares; and a scheduler configured to assign each of the plurality of executables to at least one of the plurality of processors based on the plurality of target share allocations.

16. The system of claim 15, wherein the optimizer is an iterative matrix solver.

17. The system of claim 15, wherein the scheduler is an integer partitioning problem solver.

18. The system of claim 15, wherein M>N.

19. The system of claim 15, further comprising a computer operating system in which the optimizer and the scheduler are integrated therein.

20. The system of claim 19, wherein the computer operating system is either a batch scheduling operating system or a grid computing operating system.

21. The system of claim 15, wherein the processors are central processing units.

22. The system of claim 15, wherein the processors are input/output resources.

* * * * *